(12) United States Patent
Liao

(10) Patent No.: US 7,990,637 B2
(45) Date of Patent: Aug. 2, 2011

(54) AUTOFOCUS LENS MODULE

(75) Inventor: Chia-Hung Liao, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/768,741

(22) Filed: Apr. 28, 2010

(65) Prior Publication Data

US 2011/0075281 A1    Mar. 31, 2011

(30) Foreign Application Priority Data

Sep. 29, 2009  (CN) .......................... 2009 1 0307907

(51) Int. Cl.
*G02B 7/02*    (2006.01)
(52) U.S. Cl. ....................................................... 359/824

(58) Field of Classification Search .................. 359/698, 359/824, 704
See application file for complete search history.

(56) References Cited

U.S. PATENT DOCUMENTS 7,446,965 B2 * 11/2008 Su et al. ........................ 359/824

* cited by examiner

*Primary Examiner* — Alicia M Harrington
(74) *Attorney, Agent, or Firm* — Raymond J. Chew

(57) ABSTRACT

An autofocus lens module includes a holder defining a space, a barrel positioned in the space of the holder, a first post extended from an outer surface of the barrel, a first spring connecting adjacent ends of the barrel and the holder such that the barrel is maintained in the holder, and a first piezoelectric actuator. The first piezoelectric actuator is fixed on an internal surface of the holder and capable of deforming along a central axis of the holder. The first piezoelectric actuator is coupled with the first post so as to move the barrel along the central axis of the holder.

20 Claims, 3 Drawing Sheets

AUTOFOCUS LENS MODULE

BACKGROUND

1. Technical Field

The present disclosure relates to an autofocus lens module.

2. Description of Related Art

Autofocus lens modules often employ a voice coil motor to move a lens barrel in a holder to realize the autofocus function. Because the barrel of the autofocus lens modules is normally threaded into the holder, friction between the barrel and the holder can generate dust particles. Furthermore, twisting force between the barrel and the holder may angle the barrel when the barrel is threaded up or down in the holder. Moreover volume of the autofocus lens modules employing a voice coil motor is large.

Therefore, an autofocus lens module is desired to overcome the described limitations.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will now be made to the drawings to describe various inventive embodiments of the present disclosure in detail, wherein like numerals refer to like elements throughout.

Figure 1:
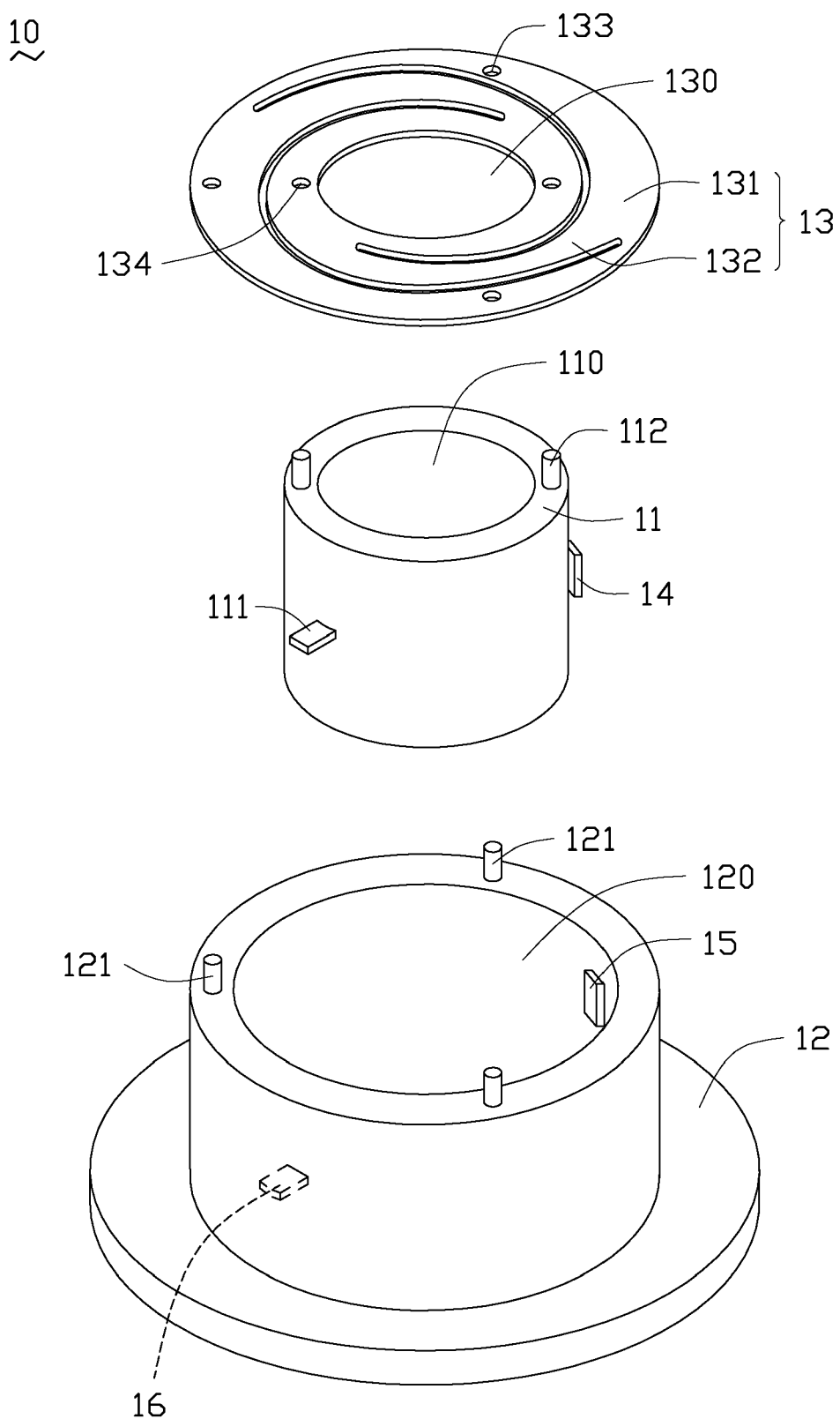
FIG. 1 is an autofocus lens module according to a first embodiment of the present disclosure.

Referring to FIG. 1, an autofocus lens module 10 according to a first embodiment of the present disclosure includes a barrel 11, a holder 12, a spring 13, a magnetic field sensor 14, a magnet 15, and a piezoelectric actuator 16.

The barrel 11 includes a cylindrical first internal surface, a cylindrical first outer surface, and an annular first top surface adjacent to the first internal and the first outer surfaces. Furthermore, as shown in FIG. 1, the barrel 11 includes a plurality of lenses 110 mounted in the barrel 11 and surrounded by the first internal surface, a magnetic field sensor 14 formed on the first outer surface of the barrel 11, a post 111 formed on the first outer surface of the barrel 11 and spaced from the magnetic field sensor 14, two first protrusions 112 formed on the first top surface adjacent to an object side of the barrel 11. In this embodiment, the magnetic field sensor 14 is fixed on the first outer surface of the barrel 11 or alternatively embedded in the first outer surface of the barrel 11. The post 111 is cubical and arranged to protrude perpendicular from the first outer surface of the barrel 11. The two first protrusions 112 are symmetrically arranged at two opposite sides of the first top surface. In alternative embodiments, the barrel 11 can include only one lens 110.

The holder 12 includes a cylindrical second internal surface, a cylindrical second outer surface, and an annular second top surface adjacent to the second internal and the second outer surfaces. The second internal surface defines a receiving space 120 accommodating the barrel 11. In this embodiment, an internal diameter of the holder 12 is slightly wider than an outer diameter of the barrel 11. The holder 12 includes three second protrusions 121 formed on the second top surface equidistantly. In other words, the three second protrusions 121 are symmetrically arranged on the second annular top surface.

The magnet 15 is fixed on the second internal surface of the holder 12 with the magnetic field thereof encompassing magnetic field sensor 14. The magnetic field sensor 14, detects distance to magnet 15 based on the magnetic field thereof, and generates varying position signals accordingly. Position of the magnetic field sensor 14 can thus be calculated by a processor (not shown), as shown in FIG. 1, when the barrel 11 moves in the holder 12, giving position of the barrel 11.

The spring 13 is planar and includes an opening 130 defined in a central portion, an elastic portion 132 surrounding the opening 130, and a fixing portion 131 connected with and fixing two opposite terminals of the elastic portion 132. The opening 130 is a lens aperture of the lens 110. The elastic portion 132 defines two first block holes 134 corresponding to the first protrusion 112. The fixing portion 131 defines three second block holes 133 corresponding to the second protrusion 121. Alternatively, the number of first block holes 134 and first protrusions 112 can be three or four. The number of second block holes 133 and second protrusions 121 can also be four or five.

In one embodiment, the first protrusions 112 are correspondingly received in the first block hole 134 and tightly sealed therein by glue such that the an end of the barrel 11 is fixed with the elastic portion 132. After that, the second protrusions 121 are correspondingly received in second block holes 133 and tightly sealed therein by glue such that the fixing portion 131 is fixed on the second top surface of the holder 12 and the barrel 11 is maintained in the receiving space 120 of holder 12 by the spring 13.

The piezoelectric actuator 16 is fixed on the second internal surface of the holder 12 corresponding to the post 111. The piezoelectric actuator 16 can deform to extend or contract parallel to a central axis of the holder 12. One end of the piezoelectric actuator 16 is fixed with the post 111 such that the piezoelectric actuator 16 can move the barrel 11 to a desired position by pushing or drawing the post 111 of the holder 12. Alternatively, the piezoelectric actuator 16 can be fixed with the post 111 in other different manner, such as to make the post 111 be received in a hole defined in one end of the piezoelectric actuator 16.

The autofocus lens module 10 can realize an autofocus function by driving the piezoelectric actuator 16 to generate a predetermined deformation according to a corresponding driving voltage by the processor so as to move the barrel 11 in the holder 12 as shown in FIG. 1. Furthermore, because the processor of autofocus lens module 10 can precisely calculate the position of the barrel 11 according to the different position signals, the predetermined deformation of the piezoelectric actuator 16 can also be slightly adjusted according to the calculated position of the barrel 11 to realize precise autofocus function.

Because barrel 11 of the lens 110 is maintained in the holder 12 via the spring 13, minimal twisting force occurs between the barrel 11 and the holder 12 with associated generation of particles therebetween is eliminated. Moreover, because the piezoelectric actuator 16 is positioned in the holder 12, volume of the autofocus lens module 10 is correspondingly minimized.

Figure 2:
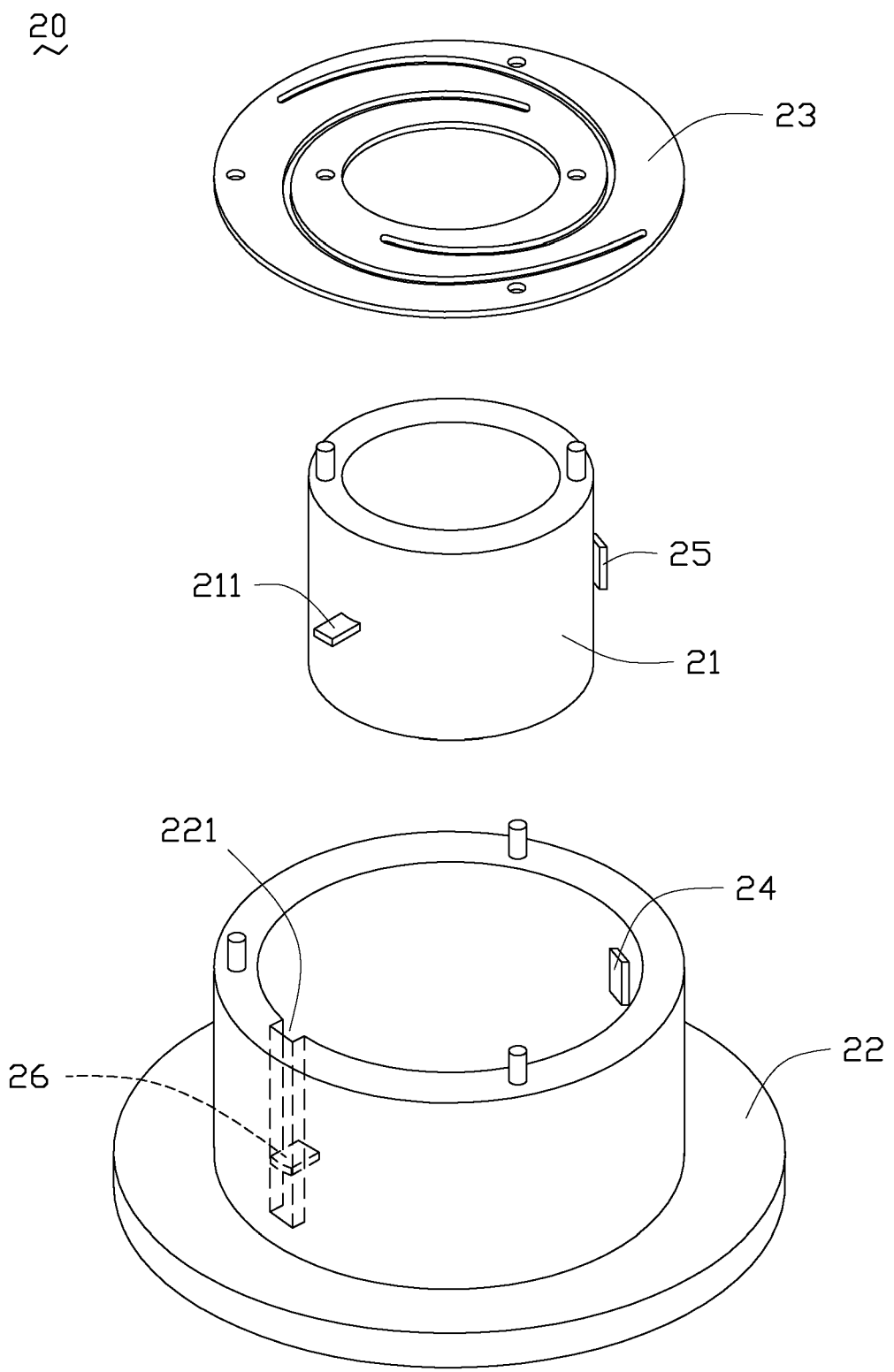
FIG. 2 is an autofocus lens module according to a second embodiment of the present disclosure

Referring to FIG. 2, an autofocus lens module 20 according to a second embodiment of the present disclosure differs from autofocus lens module 10 only in that a magnetic field sensor 24 is fixed to a second internal surface of a holder 22, and a magnet 25 is fixed on a first outer surface of the barrel 21. A groove 221 is defined in the second internal surface of the holder 22 parallel to the central axis of the holder 22. The groove 221 is configured for receiving a portion or all of the post 211 when the barrel 21 is maintained in the holder 22. In this embodiment, the piezoelectric actuator 26 can deform to move the post 111 of the holder 12 along the groove 221 so as to guide the movement of the barrel 21.

Figure 3:
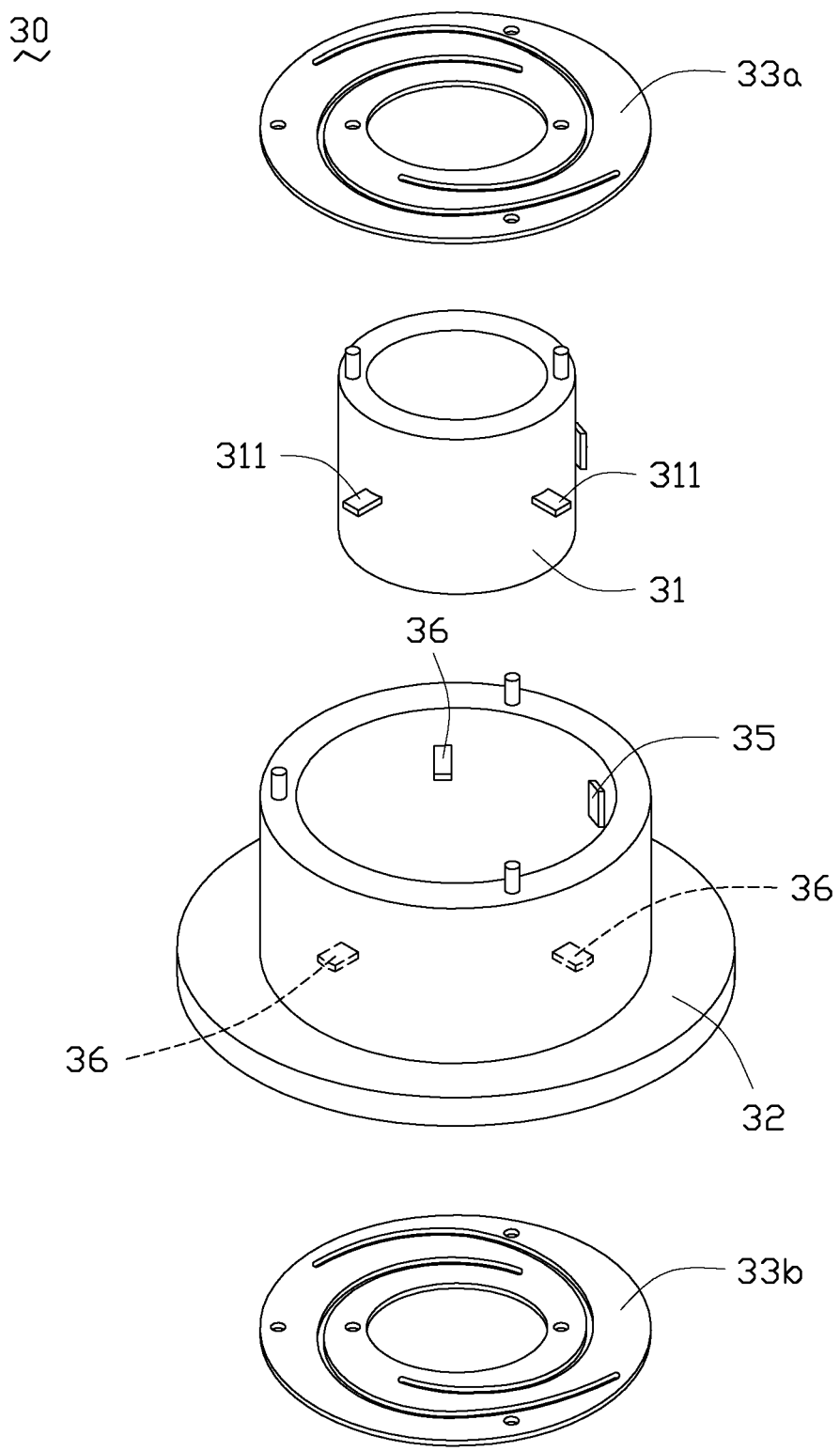
FIG. 3 is an autofocus lens module according to a third embodiment of the present disclosure.

Referring to FIG. 3, an autofocus lens module 30 according to a third embodiment of the present disclosure differs from the autofocus lens module 10 only in that the autofocus lens module 30 includes two second springs 33a, 33b, three piezoelectric actuators 36 symmetrically formed on an internal surface of the holder 32, and three posts 311 (only two posts 311 are shown) symmetrically formed on an outer surface of the barrel 31 corresponding to the piezoelectric actuators 36.

One of the springs 33a is fixed on an annular top surface of the holder 32 near the object side. The other spring 33b is fixed on an annular bottom surface of the holder 32 (not shown) near the image side. That is, the body of the barrel 31 is maintained in the holder 32 by the two springs 33a, 33b such that a central axis of the barrel 31 is approximately co-axial with a central axis of the holder 32.

In one embodiment, the three posts 311 are arranged in a plane perpendicular to the central axis of the barrel 31 and distances between adjacent two posts 311 are equivalent. Similarly, the three piezoelectric actuators 36 are arranged in a plane perpendicular to the central axis of the holder 32 and distances between adjacent two piezoelectric actuators 36 are also equivalent. The piezoelectric actuators 36 are respectively fixed with the posts 311. Alternatively, the number of posts 311 and piezoelectric actuators 36 can also be two, four, or five.

Because the posts 311 and the piezoelectric actuators 36 are symmetrically arranged around the central axis of the holder 32, an inclination of the barrel 31 when the barrel 31 is moved along the central axis of the holder 32 can be depressed or eliminated. Therefore a further precise autofocus of the autofocus lens module 30 is achieved.

It is to be understood, however, that even though numerous characteristics and advantages of certain inventive embodiments have been set out in the foregoing description, together with details of the structures and functions of the embodiments, the disclosure is illustrative only; and that changes may be made in detail, especially in matters of arrangement of parts within the principles of present invention to the full extent indicated by the broad general meaning of the terms in which the appended claims are expressed.

What is claimed is:

1. An autofocus lens module, comprising:
a holder defining a space;
a barrel positioned in the space of the holder;
a first post extended from an outer surface of the barrel;
a first spring connecting adjacent ends of the barrel and the holder such that the barrel is maintained in the holder; and
a first piezoelectric actuator fixed on an internal surface of the holder and being capable of deforming along a central axis of the holder, the first piezoelectric actuator coupled with the first post so as to move the barrel along the central axis of the holder.

2. The autofocus lens module of claim 1, wherein the holder comprises a groove defined in the internal surface of the holder to guide the movement of the first post.

3. The autofocus lens module of claim 2, wherein the groove is parallel to the central axis of the holder.

4. The autofocus lens module of claim 1, further comprising a magnetic field sensor and a magnet, the magnet fixed on the internal surface of the holder, and the magnetic field sensor fixed on the outer surface of the barrel.

5. The autofocus lens module of claim 4, wherein the magnetic field sensor is configured for generating positional signals according to varying distance between the magnetic field sensor and the magnet.

6. The autofocus lens module of claim 1, wherein the spring comprises an opening defined in a central portion, an elastic portion surrounding the opening, and a fixing portion to fix two opposite terminals of the elastic portion.

7. The autofocus lens module of claim 6, wherein the elastic portion defines two first block holes, and the barrel includes two first protrusions formed on a top surface of the barrel corresponding to the two block holes.

8. The autofocus lens module of claim 7, wherein the two first protrusions are correspondingly received in the two first block holes and fixed therein by glue.

9. The autofocus lens module of claim 7, wherein the two first protrusions are positioned on two opposite sides of the top surface of the barrel.

10. The autofocus lens module of claim 6, wherein the fixing portion defines three second block holes, and the holder comprises three second protrusions formed on a top surface of the holder corresponding to the three second block holes.

11. The autofocus lens module of claim 10, wherein the three second protrusions are symmetrically arranged on the top surface of the holder.

12. The autofocus lens module of claim 11, wherein the three second protrusions are correspondingly received in the three second block holes and fixed therein.

13. The autofocus lens module of claim 1, further comprising two second posts extended from the outer surface of the barrel, and two second piezoelectric actuators fixed on the internal surface of the holder being capable of deforming along the central axis of the holder.

14. The autofocus lens module of claim 13, wherein the first and second posts and the first and second piezoelectric actuators are respectively coupled.

15. The autofocus lens module of claim 13, wherein the first and second posts and the first and second piezoelectric actuators are arranged in a plane.

16. The autofocus lens module of claim 13, wherein the first and second posts and the first and second piezoelectric actuators are symmetrically arranged such that not only distances between adjacent two posts are equivalent but distances between adjacent two piezoelectric actuators are equivalent.

17. The autofocus lens module of claim 1, further comprising a second spring opposite to the first spring.

18. The autofocus lens module of claim 17, wherein the first spring is fixed on a top surface of the holder near the object side, the second spring is fixed on a bottom surface of the holder near the image side.

19. An autofocus lens module, comprising:
a holder;
a barrel maintained in the holder by a spring and movably received in the holder, the barrel being co-axial with the holder;
a plurality of posts symmetrically formed on an outer surface of the barrel; and
a plurality of piezoelectric actuators symmetrically formed on an internal surface of the holder, the plurality of piezoelectric actuators being correspondingly coupled with the plurality of posts and capable of moving the barrel in the holder.

20. The autofocus lens module of claim 19, wherein the holder comprises a plurality of grooves defined in the internal surface of the holder to correspondingly guide the movement of the plurality of posts.

* * * * *